United States Patent
Weber

(10) Patent No.: US 6,539,791 B1
(45) Date of Patent: Apr. 1, 2003

(54) METHOD AND APPARATUS FOR MEASURING FLOW BASED ON HEAT TRANSFER FROM A FLOWING MEDIUM

(76) Inventor: Günther Weber, 4805 Corian Ct., Naples, FL (US) 34114

(*) Notice: Subject to any disclaimer, the term of this patent is extended or adjusted under 35 U.S.C. 154(b) by 0 days.

(21) Appl. No.: 09/407,767

(22) Filed: Sep. 29, 1999

(30) Foreign Application Priority Data

Oct. 2, 1998 (DE) .................................. 198 45 462

(51) Int. Cl.⁷ .............................................. G01F 15/14
(52) U.S. Cl. .................................................. 73/204.14
(58) Field of Search ............. 73/204.11, 204.14–204.15, 73/204.16, 204.17, 204.18

(56) References Cited

U.S. PATENT DOCUMENTS

| | | | |
|---|---|---|---|
| 4,344,315 A | * | 8/1982 | Moxon et al. ................. 374/44 |
| 4,483,200 A | * | 11/1984 | Togawa et al. ............ 73/204.25 |
| 5,390,541 A | * | 2/1995 | Feller ....................... 73/204.25 |
| 5,710,380 A | * | 1/1998 | Talley et al. .............. 73/861.85 |
| 6,023,969 A | * | 2/2000 | Feller ....................... 73/204.25 |
| 6,208,254 B1 | * | 3/2001 | McQueen et al. ........... 340/603 |

* cited by examiner

Primary Examiner—Max Noori
(74) Attorney, Agent, or Firm—Lawrence E. Laubscher, Jr.

(57) ABSTRACT

A calorimetric flow measuring device is characterized by a single thermistor for measuring flow. The thermistor is connected within a bridge circuit which compensates for the temperature of the medium whose flow is being measured and a pulsing heater is provided to periodically heat the thermistor, the rate of cooling of which is a function of the rate of flow. A control devise such as a transistor is connected in the bridge circuit and with the pulsing heater so that temperature compensation is prevented when the heater is activated.

9 Claims, 4 Drawing Sheets

METHOD AND APPARATUS FOR MEASURING FLOW BASED ON HEAT TRANSFER FROM A FLOWING MEDIUM

BACKGROUND OF THE INVENTION

Flow sensors which operate according to a calorimetric principle are used in industrial applications. The calorimetric principle involves heating a thermistor which is a temperature dependent element or resistor, that is exposed to the flow to be monitored. The flow cools the thermistor resulting in a resistance change as a function of the velocity of the flow. This resistance change can be evaluated to determine the flow rate. Since the temperature change of the heated thermistor may be the result of changes in the temperature of the medium as well as the flow, special measures must be taken to compensate for or eliminate the influence of changes in the temperature of the medium. The present invention relates to an improved method and apparatus for measuring flow using calorimetric principles.

BRIEF DESCRIPTION OF THE PRIOR ART

Conventional calorimetric type flow monitors use two thermistors, one of which is heated to determine the flow rate, the other of which is unheated and used to measure the temperature of the medium. The thermistors are selected with the same temperature constant, so that the ratio of the two thermistors remains constant regardless of the temperature of the medium so long as the flow rate remains constant. Thus, the ratio of the two thermistors changes only with a change in the flow rate.

A problem arises in the two thermistor designs, particularly when they are arranged in a sensor immersed in a pipeline. If the temperature of the medium whose flow is being measured differs from the ambient temperature of the pipeline, a temperature drop occurs between the medium and the ambient temperature via the sensor housing. Thus the two thermistors should be arranged as closely together as possible so that they are exposed to the same temperature. However, this results in a heat flow from the heated thermistor to the reference unheated thermistor. Thus, there is a temperature difference between the temperature of the medium and the temperature of the reference thermistor. To avoid the heat flow from the heated to the unheated thermistor, the two thermistors should be spaced apart as far as possible which results in a distortion of the required reference temperature due to the temperature gradient between the temperature of the medium and the ambient temperature.

Accordingly, conventional calorimetric type flow sensors are reliable only where the temperature of the medium is the same as the ambient temperature. The greater the difference between the two, the greater the error of the sensor signal. As a result, such devices typically used as flow monitoring devices produce faulty signals where there is a temperature differential between of the medium and the surroundings. In order to compensate for the temperature differential, can be equipped with a bridge circuit where the heated thermistor serving as the flow sensor is connected in series with the unheated thermistor serving as the reference sensor. The bridge circuit provides a large signal yield from the flow sensor but also results in distortion in the reference sensor.

The present invention was developed in order to overcome these and other drawbacks of the prior devices by providing a flow sensor which compensates for the temperature of the medium while providing accurate measurements of the flow thereof.

SUMMARY OF THE INVENTION

Accordingly, it is a primary object of the present invention to provide a method and apparatus for measuring the flow of a medium using a thermistor as a temperature sensor arranged in the medium and a heating device for periodically heating the thermistor to a first temperature. Once heated, the thermistor cools and its resistance changes as a function of the flowing medium. The changing resistance is reflected in an output signal from the thermistor. A bridge circuit is connected with the thermistor to maintain a constant voltage as the temperature of the medium changes, thereby to compensate for fluctuations in the temperature of the medium, whereby the output signal is solely a function of the flow of the medium.

According to a further object of the invention, the bridge circuit includes a control device operated by the heating device to prevent compensation of the sensor during periodic heating of the thermistor. The heating device preferably comprises a resistance element arranged in spaced relation from the thermistor and a pulse generator connected with the resistance element for periodically energizing the resistance element to heat the thermistor to the first temperature.

The control device may comprise a transistor, a current or voltage source, an operational amplifier, or a microprocessor.

BRIEF DESCRIPTION OF THE FIGURES

Other objects and advantages of the invention will become apparent from a study of the following specification when viewed in the light of the accompanying drawing, in which:

FIG. 4b is a graph representing the output of the sensor corresponding to the application of the pulses of FIG. 4a.

DETAILED DESCRIPTION

Figure 1:
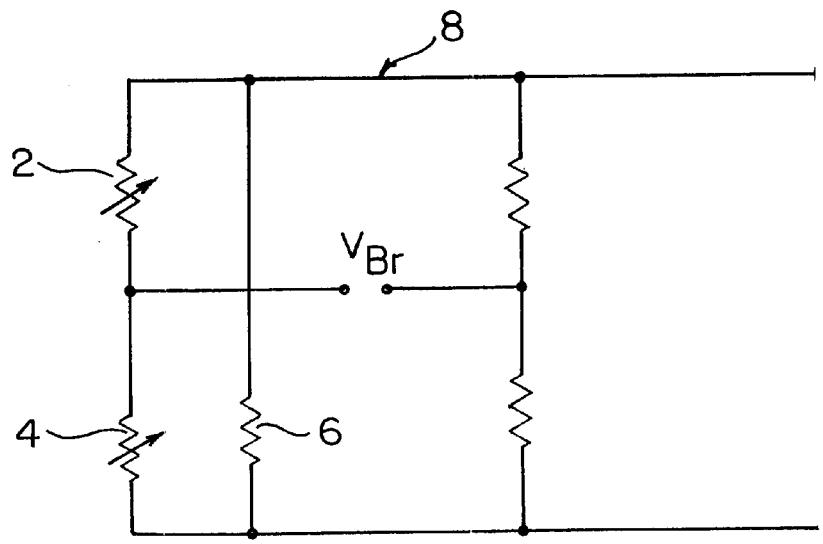
FIG. 1 is a circuit diagram of a calorimetric flow sensor according to the prior art.

Referring first to FIG. 1, a calorimetric flow sensor according to the prior art will be described. The sensor circuit includes a first thermistor 2 used to measure the temperature of the medium in which the sensor is immersed and a second thermistor 4 which is used for flow measurement. The second thermistor 4 is connected in series with the unheated first thermistor 2 and is heated by a resistance 6. A bridge circuit 8 is connected with the first and second thermistors. Changes in the resistance of the first unheated thermistor are caused by changes in the temperature of the flowing medium. Changes in the resistance of the second heated thermistor are caused by cooling of the thermistor as a function of the flow of the medium.

Figure 2:
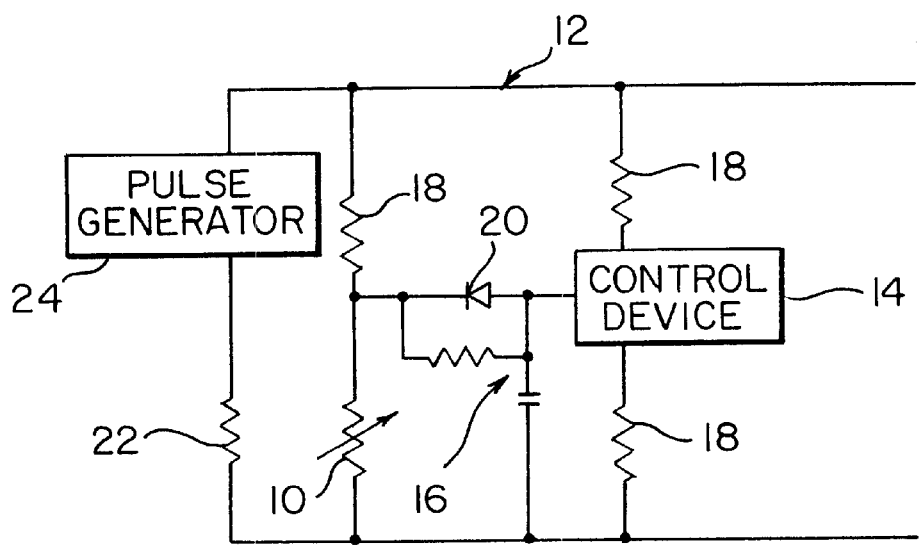
FIG. 2 is a circuit diagram of a calorimetric flow sensor according to the invention.
Figure 3A:
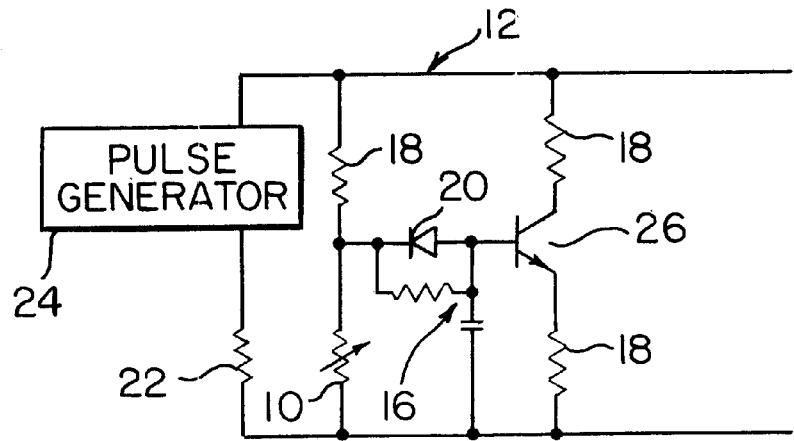
FIGS. 3a–3e are circuit diagrams of alternative embodiments for the bridge circuit of FIG. 2 showing various control devices.
Figure 3B:
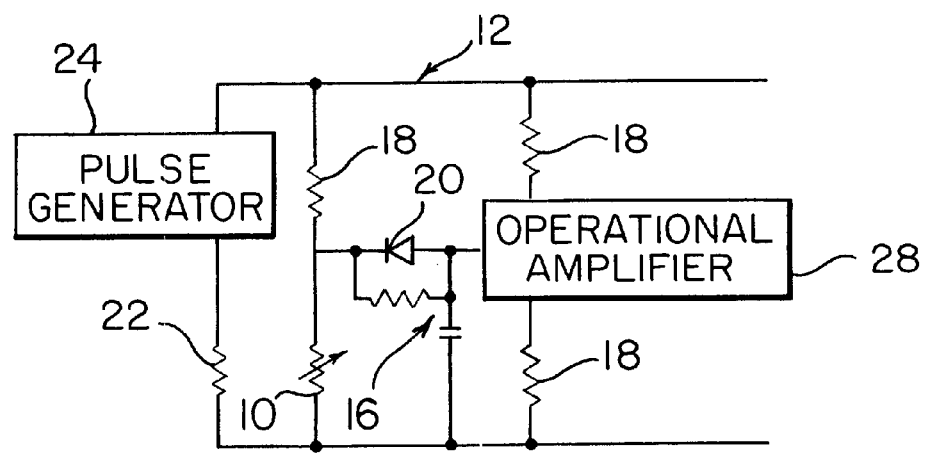
Figure 3C:
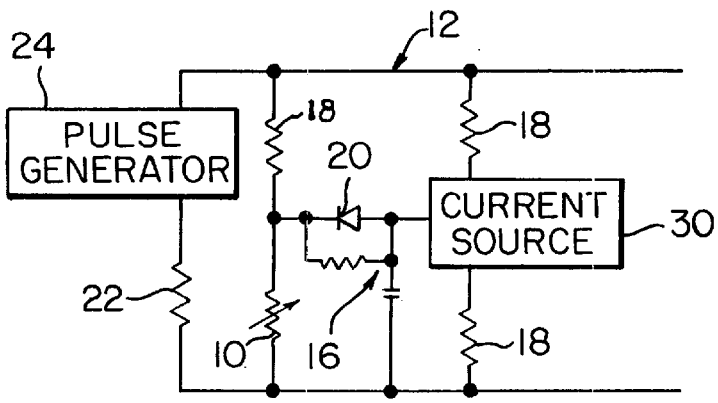
Figure 3D:
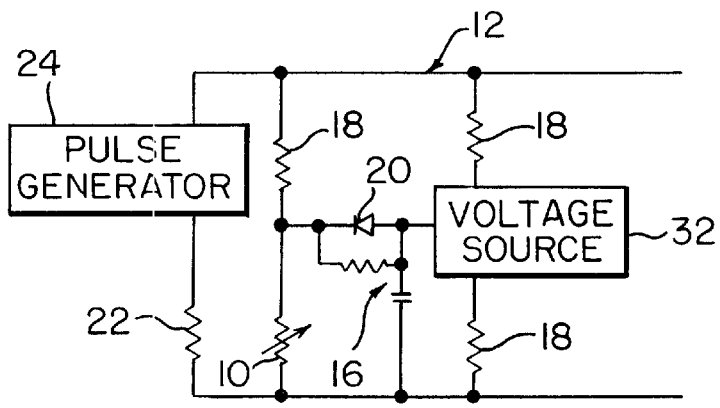
Figure 3E:
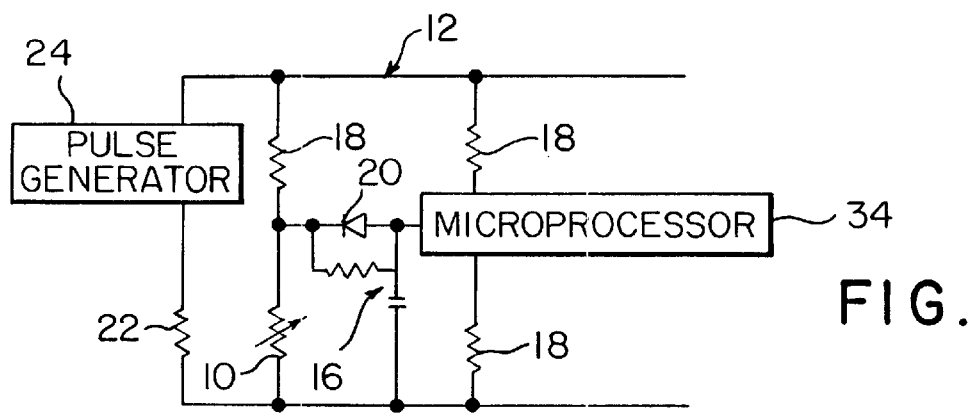

The improved flow measuring device is shown in FIG. 2. It comprises only one thermistor 10 which is connected in a bridge circuit 12 which includes a control device 14, an RC circuit 16, and bridging resistors 18. A diode 20 may be connected with the control device and the RC circuit. A resistance type heater 22 is arranged adjacent to the flow sensing thermistor 10 and a pulse generator 24 is connected in series with the resistance heater 22 to periodically activate or "pulse" the heater which in turn periodically heats the thermistor to a first elevated temperature. During the inactive period of the heater as controlled by the pulse generator, the thermistor cools from the first temperature as a function of the flow of the medium in which the sensor is immersed. The output signal from the thermistor during cooling is used to calculate the flow rate of the medium.

The bridge circuit maintains a constant voltage as the temperature of the medium changes, thereby compensating for fluctuations in the temperature of the medium. Thus, the output signal from the thermistor 10 is solely a function of flow. The RC circuit prevents readjustment of the bridge voltage and thus helps to maintain the bridge voltage constant.

The control device prevents temperature compensation of the sensor by the resistance heater. This is because the pulse generator deactivates the control device when the resistance heater is in the on condition to heat the thermistor. Suitable control devices include a transistor 26, an operational amplifier 28, a constant current source 30, a constant voltage source 32 or a microprocessor 34 as shown in FIGS. 3a–e, respectively.

Figure 4A:
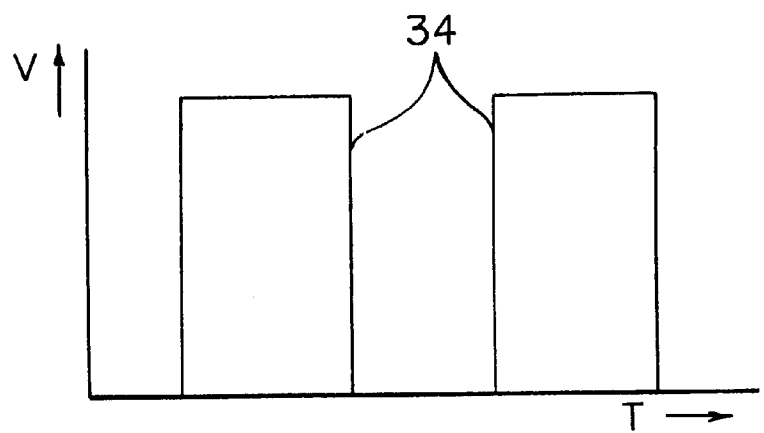
FIG. 4a is a graph representing the pulsing operation of the resistance heater of the invention.
Figure 4B:
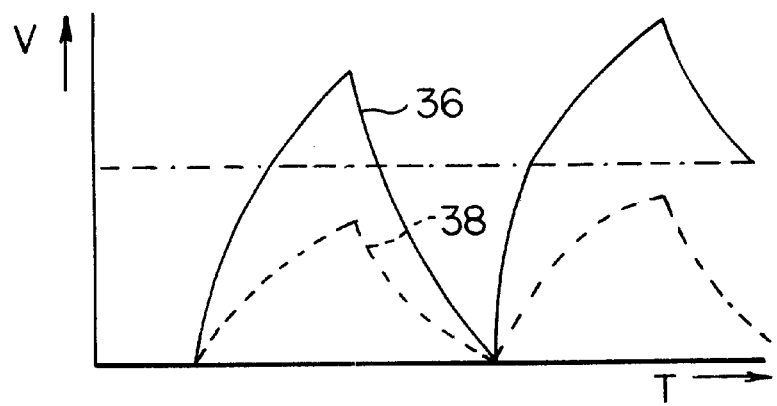

In FIGS. 4a and 4b are shown graphical representations of the operation of the heater and the output of the thermistor 10, respectively. More particularly, FIG. 4a is a plot of voltage V versus time T. When the pulse generator activates the resistance heater, voltage pulses 34 are generated which are used to heat the thermistor. Between the pulses, no voltage is delivered to the resistance heater. Referring now to FIG. 4b, the graph shows that the output resistance signal 36 of the thermistor increases as the temperature of the thermistor increases upon activation of the resistance heater. When the pulses 34 are stopped, the thermistor cools and the output signal representing the resistance of the thermistor decreases. This decrease is a function of the flow rate. The line 38 represents the output signal of the thermistor for a slower flowing fluid.

While in accordance with the provisions of the patent statute the preferred forms and embodiments of the invention have been illustrated and described, it will become apparent to those of ordinary skill in the art that various changes and modifications may be made without deviating from the inventive concepts set forth above.

What is claimed is:

1. Apparatus for measuring the flow of a medium, comprising
   (a) a fixed temperature sensor in contact with the medium;
   (b) means for periodically heating said temperature sensor to a first temperature, said temperature sensor producing an output signal as a function of the changes in the temperature of said sensor from said first temperature resulting from the flow of the medium; and
   (c) a bridge circuit connected with said temperature sensor for maintaining a constant voltage as the temperature of the medium changes, thereby to compensate for fluctuations in the temperature of the medium, whereby said sensor output signal is solely a function of the flow of the medium.

2. Apparatus as defined in claim 1, wherein said bridge circuit includes control device which prevents compensation of said sensor by said heating means.

3. Apparatus as defined in claim 2, wherein said temperature sensor comprises a thermistor whose resistance changes as a function of temperature.

4. Apparatus for measuring the flow of a medium, comprising
   (a) a fixed temperature sensor in contact with the medium;
   (b) a resistance element arranged in spaced relation from said temperature sensor;
   (c) a pulse generator connected with said resistance element for periodically energizing said resistance element to heat said sensor to a first temperature, said temperature sensor producing an output signal as a function of the changes in the temperature of said sensor from said first temperature resulting from the flow of the medium;
   (d) a bridge circuit connected with said temperature sensor for maintaining a constant voltage as the temperature of the medium changes, thereby to compensate for fluctuations in the temperature of the medium, whereby said sensor output signal is solely a function of the flow of the medium; and
   (e) a control device connected with said bridge circuit and said pulse generator to deactivate said bridge circuit and prevent compensation for temperature fluctuation of the medium when said pulse generator energizes said resistance element to heat said sensor.

5. Apparatus as defined in claim 4, wherein said bridge circuit further comprises an RC circuit for maintaining said bridge voltage constant.

6. Apparatus as defined in claim 5, wherein said control device is arranged in series with said temperature sensor.

7. Apparatus as defined in claim 5, wherein said control device comprises a transistor.

8. Apparatus as defined in claim 5, wherein said control device comprises one of an operational amplifier, a constant current source, a constant voltage source, and a microprocessor.

9. A method for measuring the flow of a medium, comprising the steps of
   (a) arranging a temperature sensor in a stationary position within the medium;
   (b) periodically heating said temperature sensor to a first temperature, said temperature sensor producing an output signal as a function of the changes in the temperature of said sensor from said first temperature resulting from the flow of the medium; and
   (c) maintaining a constant voltage within a bridge circuit connected with said temperature sensor as the temperature of the medium changes, thereby to compensate for fluctuations in the temperature of the medium, whereby said sensor output signal is solely a function of the flow of the medium.

* * * * *